(12) United States Patent
Kornprobst

(10) Patent No.: US 10,218,174 B2
(45) Date of Patent: Feb. 26, 2019

(54) METHOD FOR COLLISION MONITORING

(71) Applicant: KRONES AG, Neutraubling (DE)

(72) Inventor: Stefan Kornprobst, Regensburg (DE)

(73) Assignee: Krones AG, Neutraubling (DE)

( * ) Notice: Subject to any disclaimer, the term of this patent is extended or adjusted under 35 U.S.C. 154(b) by 258 days.

(21) Appl. No.: 15/317,891

(22) PCT Filed: Feb. 16, 2016

(86) PCT No.: PCT/EP2016/053257
§ 371 (c)(1),
(2) Date: Dec. 9, 2016

(87) PCT Pub. No.: WO2016/146327
PCT Pub. Date: Sep. 22, 2016

(65) Prior Publication Data
US 2017/0302076 A1    Oct. 19, 2017

(30) Foreign Application Priority Data

Mar. 19, 2015   (DE) .......................... 10 2015 205 039

(51) Int. Cl.
*H02J 3/06*     (2006.01)
*B67C 3/00*     (2006.01)
(Continued)

(52) U.S. Cl.
CPC ................ *H02J 3/06* (2013.01); *B67C 3/007* (2013.01); *B67C 7/0006* (2013.01); *H02J 3/14* (2013.01);
(Continued)

(58) Field of Classification Search
CPC ........ H02J 3/06; H02J 3/14; H02J 3/38; H02J 9/04; H02J 9/06; B65B 57/02;
(Continued)

(56) References Cited

U.S. PATENT DOCUMENTS 6,064,165 A      5/2000 Boisvert et al.
2015/0338262 A1  11/2015 Glaser et al.

FOREIGN PATENT DOCUMENTS

| CN | 104412077 A | 3/2015 |
|----|-------------|--------|
| DE | 29724886 U1 | 5/2005 |

(Continued)

OTHER PUBLICATIONS

Chinese Patent Office, First Office Action for Chinese Patent Application No. 201680001778.1 (and English translation) dated Jun. 28, 2018, 13 pages.

(Continued)

*Primary Examiner* — Robert Deberadinis
(74) *Attorney, Agent, or Firm* — Lowenstein Sandler LLP

(57) ABSTRACT

Method for collision monitoring for a periodically moving, electrically driven component of a container handling machine with another component, wherein a limit value for a measured variable that is indicative of a collision between the components is stipulated that, when exceeded, prompts the drive of the component to be shut down, characterized in that the limit value for the measured variable is determined dynamically for a current period of the movement of the component on the basis of the measured variable measured during a preceding period, and a container handling machine designed to perform the method.

20 Claims, 4 Drawing Sheets

(51) Int. Cl.
*H02P 29/02* (2016.01)
*B67C 7/00* (2006.01)
*H02J 3/14* (2006.01)
*H02J 9/04* (2006.01)
*H02J 9/06* (2006.01)
*B65B 57/02* (2006.01)
*H02J 3/38* (2006.01)

(52) U.S. Cl.
CPC .................. *H02J 9/04* (2013.01); *H02J 9/06* (2013.01); *H02P 29/02* (2013.01); *B65B 57/02* (2013.01); *G05B 2219/37624* (2013.01); *H02J 3/38* (2013.01)

(58) Field of Classification Search
CPC ....... B67C 3/007; B67C 7/0006; H02P 29/02; G05B 2219/37624
See application file for complete search history.

(56) References Cited

FOREIGN PATENT DOCUMENTS

| | | |
|---|---|---|
| DE | 102013215167 A1 | 2/2015 |
| EP | 0692856 A2 | 1/1996 |
| EP | 1072386 A2 | 1/2001 |
| EP | 1858153 A2 | 11/2007 |
| WO | 96/40558 A1 | 12/1996 |
| WO | 2014/059322 A1 | 4/2014 |

OTHER PUBLICATIONS

European Patent Office, International Search Report (and English translation) for PCT application PCT/EP2016/053257 dated May 17, 2016, 7 pgs.

METHOD FOR COLLISION MONITORING

RELATED APPLICATION

This patent application claims the benefit under 35 U.S.C. § 371 of International Patent Application No. PCT/EP2016/053257, filed on Feb. 16, 2016, which claims the benefit of German Patent Application No. 102015205039.4, filed on Mar. 19, 2015, which are hereby incorporated by reference in their entirety.

FIELD OF THE INVENTION

The present invention relates to a method for collision monitoring for a periodically moving, electrically driven component according to the preamble of claim 1 and a container handling machine according to the preamble of claim 10.

PRIOR ART

From the prior art, methods for monitoring the movement of components or for controlling the movement are known.

Thus, EP 1 858 153 A2 for example discloses a method, according to which the time profile of a measured variable, in this case the rotational speed, of an electric drive of a sensor on a load element is collected and a temporal change of this rotational speed is evaluated by a monitoring device, whereupon by means of an assessment, an identification occurs to that effect that an impermissible rotational oscillation state of the load is available and that by means of an appropriate feedback signal, the control parameters for the operation of the electric drive are changed. With this method, it can be ensured that the movement of the moving component in the provided parameter ranges occurs, which can reduce the risk of collisions.

Furthermore, it is known for electrically driven components, which are driven for example by means of a servo drive via a control unit, to provide limit values for specific parameters of the movement, such as for example the speed or transmission of the torque or the current transmitted to the motor. These limit values serve as indicator for the fact that a collision of a moving component with another component of the device has occurred when the limit values are exceeded, which could lead to considerable damage to the entire container handling machine, if the drive is not immediately shut down. For this purpose, it is known to stop the drive when the limit value is exceeded in order to prevent the machine from being more seriously damaged. Furthermore, these limit values can be used for monitoring the general functionality of the machine.

However, the determination of this limit value deems to be difficult, as during movement of the moving component, fluctuations can occur in respect of the load of the component, the transmitted torque and the speed during the movement of the movable component. Thus, the load of the component may change during the movement, for example by receiving or transferring a container or by frictional resistances, as well as by a change of the fill level, or generally the weight of a transported container. Specifically, in the case of components, which are in fact periodically moved, but also have phases of a standstill during this periodic movement, thus, take a temporally changing acceleration, the definition of such a limit value is difficult. So far, the limit value therefore needs to be chosen high enough that during the error-free operation of the machine, no false alarm is triggered. On the other hand, the limit value, however, needs to be adjusted such that a malfunction, in particular a collision of components or containers is identified as direct as possible in order to avoid further damage. These requirements are contradictory and, therefore, a determination of the limit value is difficult.

PROBLEM

Starting from the known prior art, therefore, the problem underlying the present invention is to provide a method for collision monitoring, which allows a reliable determination of the limit value and preferably avoids unintended false alarms.

SOLUTION

According to the invention, this problem is solved by the method for collision monitoring according to claim 1 and the container handling machine according to independent claim 10. Preferred embodiments of the invention are included in the dependent claims.

The method according to the invention for collision monitoring is characterized in that the limit value of the measured variable for a current period of movement of the component is dynamically determined on the basis of a measured variable measured during the preceding period. Since, even during normal operation without collisions, changes regarding the movement profile of the movable component may occur, which are definitely within the permissible range, this method allows to adapt the limit values for the corresponding measured variable so that usual fluctuations do not lead to a false alarm due to an exceeding of a set limit value, although there is no collision at all. Furthermore, it can be ensured that collisions are reliably detected and that the drive can be shut down before too great damage to the machine occurs.

In one embodiment, the limit value of the measured variable for a current period of the movement of the component is dynamically determined on the basis of the measured value measured during the immediately preceding period. Since during normal operation without any malfunction, the profiles of the measured values of directly successive periods differ only very slightly, an adaption of the limit value can occur taking these minor changes into account and simultaneously reducing the risk of occurring false alarms.

According to a further embodiment, the limit value of the measured variable for a current period can be different from the limit value of the measured variable for a preceding period by a maximum absolute value or a maximum relative value. Thus, deviations, which occur for example due to the usual wear and tear during the service life of a component and of the drive, can be taken into account when stipulating the limit value.

In a specific development of this embodiment, it is provided that the maximum absolute value and/or the maximum relative value is determined on the basis of an operating period of the container handling machine and/or on the basis of the age of the component and/or on the basis of the age of the motor driving the component. Thus, for example via the determination of a gradient for the change of the limit values over a long period of time, it can be evaluated to which extent the wear of a machine or of a component contributes to the change and a corresponding correction for the determination of future limit values can be taken into account.

Further, it can be provided that the limit value is a non-constant function over the entire period or is constant over the period duration. Regarding movable components, for example undergoing a rotation with a rotational speed, which is non-constant over the duration of the period, a non-constant limit value can be used in order to avoid false alarms.

Furthermore, the method can comprise that the measured variable is at least of one torque transmitted to the component, a contouring error of the drive, the motor current or a load torque. These variables are indicative of the movement of the component and can be determined very precisely, which permits the determination of the limit value with a great accuracy.

If it is stipulated that a difference between a limit value of the current period of the movement of the component and the limit value of the preceding period of the movement of the component, always has the same sign for a number of successive periods, it can be provided that for determining the limit value of the measured variable further state values of the drive in real time are collected and taken into account. Cumulative deviations pointing in the same direction (same sign) indicate that the machine, for example due to its service life and the associated wear, undergoes a change in the movement profile of the movable component. By means of a corresponding correction by taking into account the state values, as for example the age of the container handling machine, this error may be considered when calculating the limit value.

Thereby, it may be provided that a time-dependent correction value having the same sign is derived from the consideration of the state values of the drive and the limit value for a current period is added to the calculation. By means of this correction value, the change in these state values can be taken into account and false alarms can be avoided more effectively.

According to an embodiment of the method, it is provided that in addition to the limit value during detecting a collision, operating states including at least one of an acceleration of the component, idling or production, is taken into account. If, for example, the limit value for operating the container handling machine under full load is determined, this limit value may not be representative for an acceleration or a starting phase of the component or the movement of the component or for an idling of the container handling machine, which is why these operating states need to be considered separately, in order to avoid also in this case false alarms during test runs.

According to the invention, a container handling machine is provided, which is configured to carry out a collision monitoring method according to one of the above described embodiments.

The container handling machine thereby can comprise at least one of the sensors for detecting the position of the component, sensors for detecting the acceleration of the component, sensors for detecting temperature values, which are indicative of the function of the drive, and sensors for detecting the load of the component.

Furthermore, it may be provided that a non-volatile memory is assigned to the control unit, in which calculated limit values may be stored and retrieved by the control unit for further use.

In a development of this embodiment, it is provided that in said non-volatile memory further operating parameters, which can be used for calculating the limit values, may be stored and retrieved by the control unit. Thus, it is not only possible to compare the limit values with one another for the calculation, for example in order to detect that a correction of the limit values is necessary due to wear of parts of the container handling machine, but as well irregularities in the operating parameters themselves can be determined, which may be helpful for calculating the limit value.

According to the invention, furthermore, an alternative method for collision monitoring of a container transported in a container handling machine with a component or with another container transported in the container handling machine is provided, wherein a limit value of a measured variable, which is indicative of a collision of the container with the component or with the other container, is stipulated that, when exceeded, the operation of the container handling machine is shut down, characterized in that the limit value of the measured variable for the movement of the current container is dynamically determined on the basis of a measured variable measured during a preceding container had been transported by the container handling machine. Thus, for example, a collision of an incorrectly transported container can be timely detected and the machine can be shut down in order to avoid collisions.

Furthermore, a container handling machine for handling containers, such as bottles, which is configured to carry out a method for collision monitoring according to the last mentioned embodiment, is disclosed.

BRIEF DESCRIPTION OF THE DRAWINGS DRAWING

DETAILED DESCRIPTION

Figure 1:
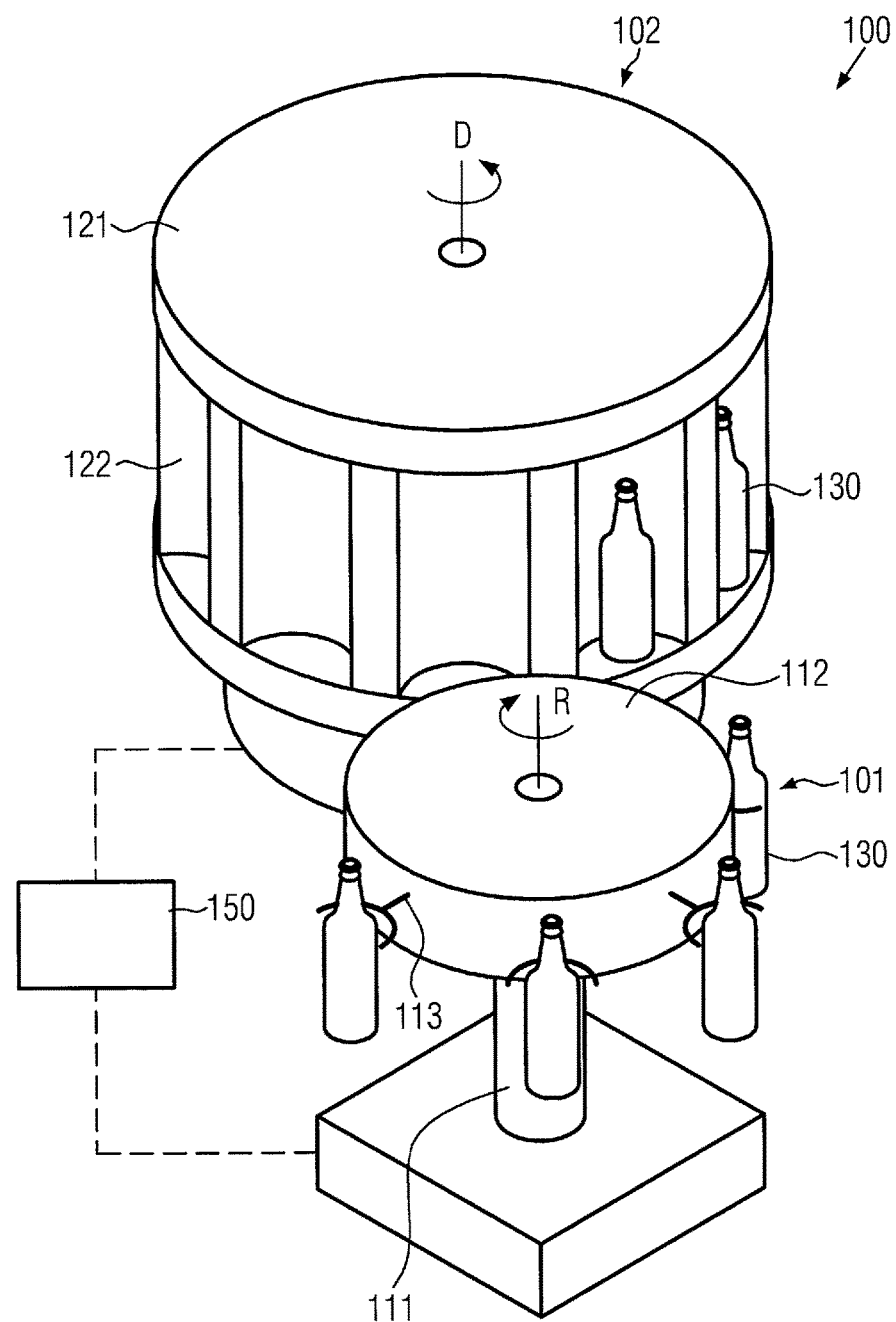
FIG. 1 is a schematic illustration of a container handling machine configured to carry out the method according to the invention, FIGS. 2a and b are schematic illustrations of the curve progression of the measured variables and limit values over a period of movement.

FIG. 1 schematically shows a container handling machine 100, for which the method for collision monitoring according to the invention may be used. The container handling machine 100 can comprise a feeding device 101, which is configured here as a rotary star 112. The latter comprises one or more gripping devices 113, with which it can receive containers 130 and transfer the same to a handling machine 102 with a carousel, on which several handling stations 122 are arranged. The rotary star rotates about a rotational axis R and the carousel 121 about a rotational axis D. Thereby, the carousel as well as the rotary star are driven via drives. Those are not shown here, however, the drive of the rotary star 112 is schematically indicated via the drive shaft 111.

The container handling machine, thus, comprises at least two movable components in the meaning of the invention, namely the rotary star 112 and the carousel 121. According to the invention, it may also be provided that only one movable component is available. Basically, the method according to the invention is intended for machines, in which due to a malfunction of the movable component with another component, a collision may occur. The container handling machine 100 therefore, does not have to be configured as indicated here, but may also be realized differently.

While in the following description reference is made to the collision of two components, it may also concern containers, which collide with components or other containers and, thus, lead to damage. For example, an incorrectly gripped container in a gripping cylinder may collide with an immovable or movable machine part. A movable component may as well collide with a container, which is fixed relative to the machine, as an error occurs during the movement of the component. The embodiments with regard to the collision of a movable component with another component of the machine, therefore also apply to the same extent to the collision of the movable component with an immovable or movable container in the machine.

For monitoring the operating state or specific operating parameters or measured variables, which are indicative of the movement of the movable components, a plurality of sensors may be provided. Thus, one or more sensors for determining the position or the acceleration of movable parts during their movement, as well as sensors for determining temperature values, in particular temperature values of the drives or lubricants, as well as the temperature of bearings, in which movable parts are mounted, may be provided.

Alternatively, the movement of container transported in the container handling machine can be monitored by sensors determining its position and monitoring its movement.

The method according to the invention is in particular preferred in case of servo drives, as there is no direct mechanical coupling between the movement of the individual movable components (for example the rotary star 112 and the carousel 121) so that the control of the movement profiles relative to one another must be regulated electronically via a control unit 150. However, in this case as well, other drives, in particular every form of electrical drives, may be used.

Regarding the container handling machine 100 as shown in FIG. 1, due to an incorrect adjustment of the movement of the rotary star 112 and the carousel 121, collisions may occur, for example of the gripping devices 113 with areas of the carousel, in which no handling stations are arranged. Such collisions may occur for different reasons. For example, a failure of the drive or a malfunction may be available so that the torque transmitted to the movable component does not correspond to the intended one so that either a warping or a forward movement of the movable component (rotary star or carousel) relative to the other component and, thus, a collision occurs. Furthermore, for example due to physically influencing one of the movable components (a loose part falls into the drive of the rotary star or carousel or the like), a malfunction may occur, which finally results in a collision. This also includes all other influences, which impact the movement of one of the movable components or of the movable component in a way that it does not run as intended and due to this influence, a collision with another component occurs.

The control of the movement of the rotary star 112 on the one hand and of the carousel 121 on the other hand via the control unit 150 takes place via the regulation of the current supplied to the electric drives or the motors. Thereby, the torque transmitted by the motors to for example the drive shaft 111 and, thus, the rotary star 112, is adjusted.

The torque can fluctuate during a circulation or a period of the movable component (for example the rotary star 112 or the carousel 121). In particular, when a movable component is started, a significantly larger torque may be necessary than when the component is moved at a constant speed. In order to detect collisions in time, limit values for measured variables, which are indicative of the movement, as for example the torque transmitted to the rotary star 112, are stipulated or determined. The basic definition of limit values is already known from the prior art. Therefore, the detection of the collision is shifted to the determination of the exceeding of the limit value of the measured variable. If the measured value, thus, for example the torque transmitted to the rotary star 112, exceeds this limit value, the control unit then assesses this as an indication that a mechanical collision between the rotary star and the carousel has occurred. However, due to the fluctuations of a corresponding measured variable, which are present in any case, for example by starting up or during the normal movement profiles, it deems to be difficult to define this limit value in such a way that false alarms are avoided, but collisions are preferably always detected.

Therefore, it is provided according to the invention that the limit value for every period of movement of the movable component is newly determined. For this purpose, the limit value for the current period of movement of the movable component based on measured variable measured during a preceding period of the movement of the movable component is determined. If during a preceding period no collision of movable components, thus, no exceeding of the previous limit value took place, it can be assumed that the measured values for the measured variable (for example the torque) during the movement of the movable component (for example the rotary star 112) during the corresponding period correspond to the normal function or the movement profile of the movable component. For the upcoming period of movement of the component (for example the next rotation of the rotary star 112), this profile of the measured variable is used to determine the new limit value, which indicates the maximum acceptable deviation of the measured variable during the next period. Up to this limit value, the actual profile of the measured variable or the accompanying actual movement of the movable component in the next period can be considered as being free of collision. It is, of course, also conceivable that the limit value is stipulated not only on the basis of the directly preceding period of movement of the movable component, but that a plurality of preceding periods and the corresponding measured values indicative of the movement of the movable components are taken into account in order to determine the limit value for the current period.

Figure 2A:
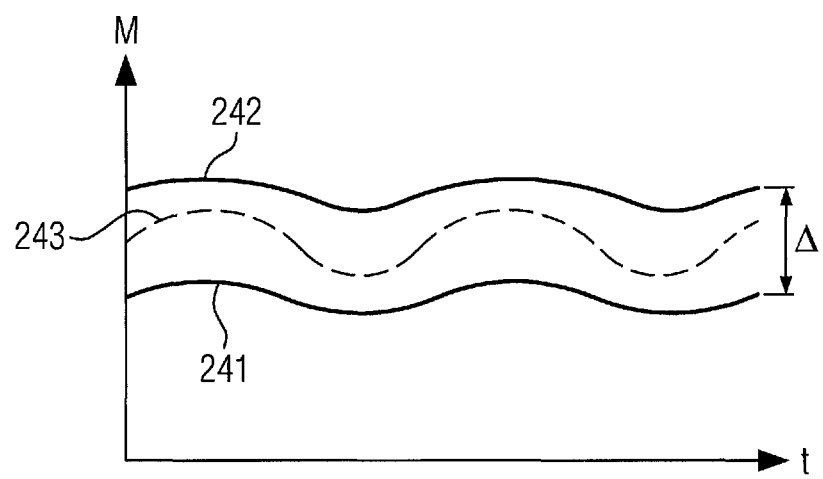
Figure 2B:
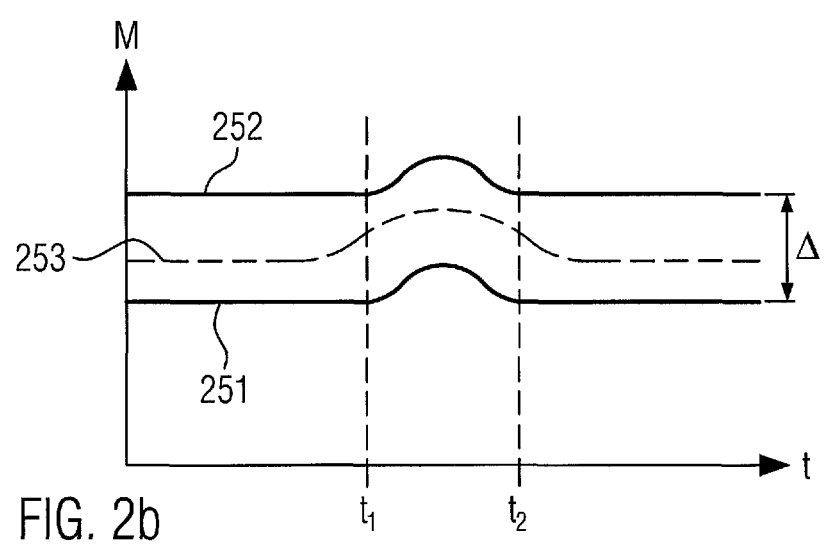

Thereto, FIGS. 2a and 2b show two possible profiles of measured variables of a preceding period and the limit value calculated therefrom for the following period of movement of the movable component.

In FIGS. 2a and 2b, the torque, which is transmitted to the movable component is set as measured variable. Of course, other measured variables are also conceivable, such as for example the acceleration, which the movable component undergoes, or a measurable contouring error of the drive, which is caused by the inertia of the movable component or a load moment, but also by the current supplied to the motor. The curve 241 shown in FIG. 2a corresponds to the torque measured during a preceding period, which acts on the movable component. For the following explanations, it is assumed that this profile of the measured variables was below a limit value being characteristic of the preceding period and, thus, no collision was detected. From these values of the curve 241, then a limit value 242, which is used as the limit value for the next period of movement of the movable component, is calculated. This limit value at any time is different by a value Δ from the dispositive measured variable 241. Thus, the changing behavior of the movement of the movable component can be taken into account. If for example the torque transmitted to the movable component changes due to wear of the components, the profile of the torque of a next period will be different to the profile 241 and for example be similar to the profile 243. Although no collision takes place, there are deviations from the preceding profile of the measured variable. This circumstance is taken into account by the determination of the limit value 242 as deviating from the profile of the measured variable 241 during the preceding period by the value Δ. As long as for the next period, for which the limit value 242 is used, the torque transmitted to the movable component corresponds to a temporal profile, which is below the limit value 242, the control unit 150 interprets this fact as a proper function and not as a collision of movable components so that no false alarm is triggered and, if appropriate, the container handling machine is shut down.

In contrast to a limit value fixed for all times, this offers the advantage that changes in the torque transmitted to the movable component, which do not influence the correct moving profile of the movable component or which do not influence such that a collision occurs, are taken into account and no false alarms are triggered, however, simultaneously, an exceeding of the limit value, which might be very likely to be indicative to a collision, is detected and the machine is shut down.

FIG. 2b shows an alternative profile 251 of the measured variable of a preceding period of movement of the movable component and the limit value 252 derived therefrom for the following period. In contrast to the profile of the measured variable over a period according to FIG. 2a (curve 241), the normal movement of the movable component according to FIG. 2b occurs such that the torque is essentially constant over the entire period duration, but fluctuates considerably in the range $t_1$ to $t_2$. With a fixed limit value, such a fluctuation, which is actually normal for the movement of a movable component, could lead to a false alarm and cause a standstill of the machine. According to the invention, however, the limit value 252 for the subsequent period of movement of the movable component is determined such that this fluctuation can be compensated. Thus, even the profile of the measured variable or the torque 253 of the next period does not trigger a false alarm here, although it is different to the profile of the torque of the preceding period 251.

The process for determining the limit value as described in FIGS. 2a and 2b is in particular preferred, if the change of the measured variable due to the advancing age of the container handling machine increases, for example by wear. While short-term changes, i.e. changes from one period to the next period, are relatively small and are significantly less than one percent of the value of the measured variable, there may occur deviations over several thousand periods of movement of the movable component during operation for years, which are noticeable, however do not entail a collision. Thus, for example, after several years of operation of the container handling machine, a deviation from the profile of the measured variable of the current period compared to the first period executed during the commissioning of the container handling machine can occur by several percent. With a fixed limit value, such a deviation would inevitably lead to a false alarm, unless the limit value is high enough or set as different enough from the profile of the measured variable at commissioning that even substantial fluctuations do not exceed the limit value. Thereby, however, actual occurring collisions may probably not be detected in time.

Therefore, according to the invention, it is provided that during determining the limit value, also changes in the profile of the measured variable are taken into account over a very long period of time. For this purpose, FIG. 3 shows a further embodiment for determining the limit value based on the measured variable measured in a preceding period of movement of the movable component.

Figure 3A:
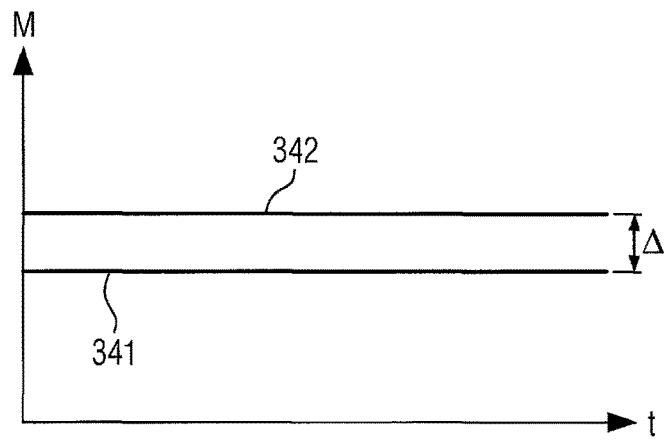
FIGS. 3a to 3c are schematic illustrations of calculated limit values and associated measured variables according to various embodiments.

Thereby, FIG. 3a shows a profile of the measured variable 341 of a preceding period as a constant function. The here exemplarily used measured value is once again the torque, which is timely constant during movement. From this, a limit value 342 can be stipulated, which is different by the value Δ from the measured variable 341 and which also permits slight fluctuations of the profile of the measured variable and, thus, the movement of the movable component during the current period.

Figure 3B:
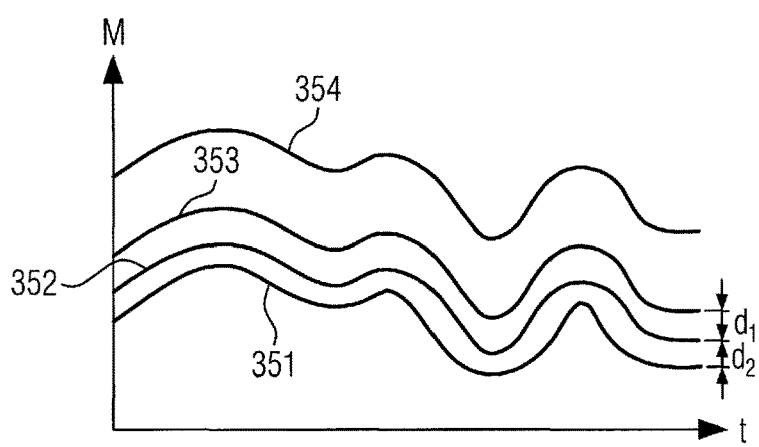

In FIG. 3b, the profiles of the measured variables of several periods are shown. These curves 351 to 353 here clearly represent the change of the profile of the measured variable due to wear and tear. Thus, for example, the curve 351 can correspond to the profile of the measured variable at commissioning the container handling machine. The curve 352 can correspond to the profile after one year of operation and the curve 353 to the profile after two years of operation. The curve 352 is spaced apart from the curve 351 by an average of the value $d_2$ and the curve 353 is spaced apart from the curve 352 by the value $d_1$. Thereby, the differences between the curves 352 and 351 as well as 353 and 352 are both positive, thus, have the same sign and correspond to changes "in the same direction". Such a change of the profile of the measured variable over the time is characteristic for wear and tear.

This can be taken into account in that the limit value 354 for a period of movement of the movable component following the curve 353 is not determined exclusively based on the last or the preceding profile of the measured variable as described in FIGS. 2a and 2b, but also in that a correction value is considered taking account of the wear of the machine. This correction value, as well, can be calculated again and again and can be newly determined for every period. However, it may also be provided that this correction value is stipulated such that it is used for at least a specific number of following periods of movement of the movable component. It is then set large enough in order to take into account the changes of the profile of the measured variable over several periods, but is still set low enough in order to reliably and undoubtedly detect possible collisions. Furthermore, this correction value may also be stipulated such that the limit value for the next period deviates from the profile of the preceding period of the measured variable, not only by a constant value, but such that the profile of the limit value as a whole is a different one, in particular "flows apart", thus, such that at commissioning, sharp changes in the measured variable (for example of the torque) are progressing less sharply with the time, thus, for a corresponding change of the torque, more time is required. This can be taken into account by determining the profile of the limit value.

Alternatively, it may also be provided here that the wear of the machine is taken into account by evaluating several periods of movement of the movable component. Thus, a gradient can be formed, on the basis of which it then can be determined whether the change in the limit value is due to wear. If this is the case, it may be provided that during calculating the limit values, a further correction term is considered taking the wear into account.

Figure 3C:
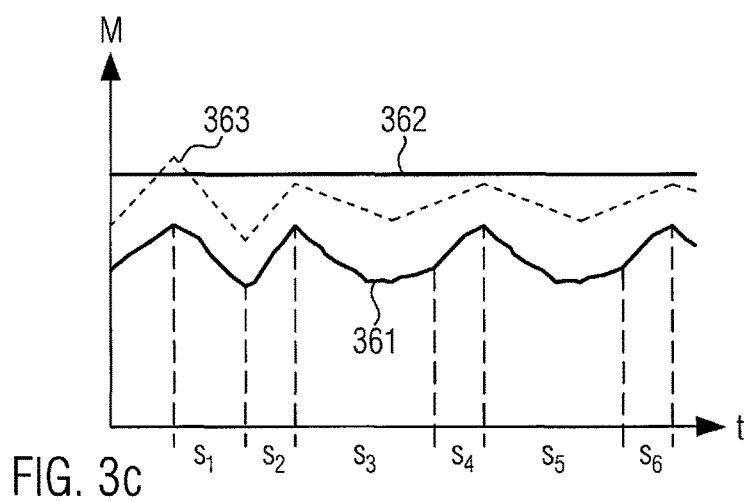

Further, it may be provided that the limit value is stipulated adaptively as illustrated in FIG. 3c. In this context, adaptive is to be understood in a way that regarding profiles of the measured variable, such as the profile 361, which exhibits strong fluctuations over a period of movement of the movable component, a limit value is stipulated, which does not necessarily follows this profile, but is for example determined as a constant value, as illustrated by means of the graph 362, or is described by means of an averaged function via the profile of the measured value during the preceding period. In order to calculate the limit value, for example, the profile of the measured value 361 can be separated into several sections $s_1$ to $s_6$. In these sections, the limit value may be stipulated as linear approximation of the profile of the measured value 361 and may be used via an offset as limit value for the subsequent period of movement, as illustrated by the curve 363. Other approximations, as well, for example a square approximation, or an approximation based on a finite Taylor series (wherein N terms are used according to the desired accuracy) are also conceivable here.

Basically, it is provided that the limit value for a subsequent period of movement of the movable component differs from the measured variable or the profile of the measured variable of a preceding period of movement of the movable component by a constant value or a percentage value. The former means that for each point in time of the next period, for which the limit value is stipulated, the limit value differs by a constant value $\Delta$ from the original value of the measured variable at this time along the profile of the measured variable of the preceding period. In such a case $g(t)=f(t)+\Delta$ (1) applies, wherein g(t) is the function describing the profile of the limit value and f(6) is the function describing the profile of the measured variable during a preceding period of movement of the movable component. To the contrary, the latter means that for the profile of the limit value $(t)=f(t)+\alpha f(t)$ (2) applies, wherein $\alpha\epsilon$ is (0;1). Hybrids, as well, are conceivable, whereby for example the value $\Delta$ is time-dependently chosen, but independent of the f(t). Furthermore, it may be provided that in example given in FIG. 2b, the limit value for the sections of the profile of the measured variable 251, in which the measured variable is nearly constant, is determined by equation (1), and for the section between the times L and $t_2$, the profile is determined by equation (2).

The correction value described with reference to FIG. 3n may also be stipulated either as a constant value or as a time-variable value or as a percentage value depending on the profile of the measured variable during a preceding period of movement of the movable component.

The limit values illustrated in FIGS. 2 and 3 were all above the profile of the measured variables from the preceding periods of movement of the movable component. However, it is understood that also two limit values can be stipulated, which then are determined as envelope of the profile of the measured variable of one preceding period or of several preceding periods. Thus, a lower limit value can be indicated for the profile of the measured variable, upon the shortfall of which it is assumed that a collision or another malfunction is present. If the measured variable during a current period then runs in the range determined by the envelope, the control unit can assess this as an accurate function or movement of the movable component.

Correspondingly, as an alternative to a limit value being above the profile of the measured variable of a preceding period, also a limit value, which is exclusively below the profile of the measured variable of the preceding period may be determined. This may be effected in the same way as it was the case with reference to FIGS. 2a and 2b, as well as FIGS. 3a-3c.

Figure 4:
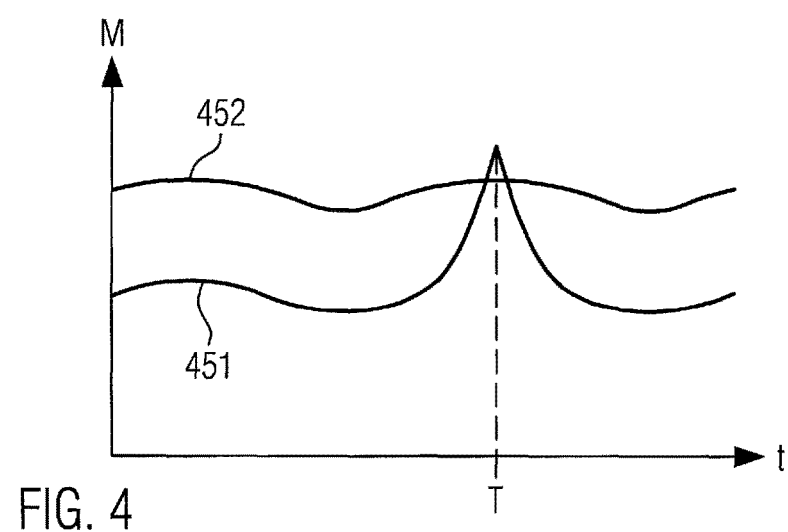
FIG. 4 is a schematic illustration of the profile of the measured variable of the movement of the component during malfunction.

Finally, FIG. 4 shows the case, in which a limit value 452 has been derived from the profile of the measured variable of a preceding period of movement of the movable component. The profile of the measured variable of the current period of movement of the movable component is illustrated with reference numeral 451. At the point in time T, the measured variable, here the torque M, which had been transmitted to the movable component, exceeds the limit value 452 and, thus, is recognized by the control unit as collision or at least as malfunction of the container handling machine, whereupon the drive of the movable component, as for example the carousel or the rotary star, as shown in FIG. 1, may be shut down in order to avoid greater damage to the container handling machine.

In order to generate a meaningful initial value for the determination of the limit values, it may be provided that during commissioning and under controlled conditions, a first period of movement of a movable component or several periods of movement of the movable component are carried out in order to generate a reference value, which can serve as initial value for the determination of the limit values or as reference for a functioning movement of the movable component during a period. Subsequent limit values may then iteratively be stipulated from the thus determined reference value and the profile of the measured variable during subsequent periods of movement of the movable component.

Thus, if several periods of movement of the movable component are passed, an average value can be stipulated, which is interpreted as a reference for the normal operation of the movable component without collision. The calculation of limit values for subsequent periods of movement of the movable component then can iteratively occur based on preceding periods of the movable component, also by considering the reference value.

In order to store the reference value, a non-volatile memory can be assigned to the control unit, to which the control unit can access, for example in order to retrieve the reference value. Alternatively, in an embodiment it may also be provided that limit values of preceding periods of movement of the movable component are stored in the non-volatile memory in order to also serve as a reference for the determination of the current limit value and in order to check whether the limit values strongly fluctuate, for example in order to create statistics on the operation of the container handling machine. Alternatively or additionally, it may also be provided that the operating parameters, such as for example the measured variables measured are stored in the non-volatile memory during the different periods of movement of the movable component so that also the profile of the measured variables of a plurality of periods of movement of the movable component can be used for determining the limit value for a current period of a movable component.

While here exemplarily only one limit value for only one measured variable of the movable component was determined, it may be provided that several limit values for different measured variables are determined, which are indicative of the movement of the movable component. Thus, not only for the torque, but also for the load acting on the drive a limit value can be stipulated. Since malfunctions do not necessarily arise directly in the exceeding of the limit value of only one measured variable, the monitoring of the behavior of several measured variables and the determination of limit values of each of these measured variables can be preferably used in order to avoid collisions of the movable component with other components, but also in order to detect other malfunctions of the movable component.

The embodiments described in FIGS. 2 to 4 for determining the limit value during the movement of the movable component may also be used for determining a limit value for the movement of a container transported in the container handling machine, wherein then corresponding sensors for determining measured variables, which are indicative of the movement of this container, are provided. However, regarding a container transported by the container handling machine, no periodic movement takes place so that the corresponding limit values cannot be stipulated based on a preceding period of movement of the container. However, the transport of the containers transported by the container handling machine essentially takes place under nearly identical conditions (velocity profile, acceleration, possible torques acting on the container). Thus, the measured variables, which were measured during the movement of a preceding container through the container warning machine (for example the position of the container or the velocity profile) may be considered as being indicative of the transport of a current container by the container handling machine. Therefore, according to the invention, for monitoring possible collisions of a container transported by the container handling machine with components or other containers, a limit value for a measured variable, which is indicative of the movement of the container by the container handling machine is determined based on the measured variables measured for the movement of a preceding container transported through the container handling machine.

Thus, the embodiments according to FIGS. 2 to 4 may also be used for the determination of the limit value for a container, which is moved through the container handling machine for the collision monitoring.

The invention claimed is:

1. A method for collision monitoring comprising:
dynamically determining a limit value for a measured variable that is indicative of a collision between a movable component of a container handling machine and an additional component or a container for a current period of movement of the movable component on a basis of the measured variable as measured during a preceding period of movement of the movable component, wherein the movable component is a periodically moving, electrically driven component;
determining, for the movable component of the container handling machine, whether the limit value for the measured variable that is indicative of a collision between the movable component and the additional component or the container is exceeded; and
responsive to determining that the limit value is exceeded, prompting a drive of the movable component to be shut down.

2. The method according to claim 1, wherein the limit value of the measured variable for the current period of movement of the movable component is dynamically determined on the basis of the measured variable measured during a directly preceding period of movement of the movable component.

3. The method according to claim 1, wherein the limit value of the measured variable for the current period differs from the limit value of the measured variable of the preceding period at the most by at least one of a maximum absolute value or a maximum relative value.

4. The method according to claim 3, wherein at least one of the maximum absolute value or the maximum relative value is determined on the basis of at least one of an operating duration of the container handling machine, an age of the movable component, or an age of a motor driving the movable component.

5. The method according to claim 1, wherein the limit value is a non-constant function over an entire period duration or is constant over the entire period duration.

6. The method according to claim 1, wherein the measured variable is at least one of a torque transmitted to the movable component, a contouring error of the drive, a motor current or a load torque.

7. The method according to claim 1, further comprising:
determining that a difference from the limit value of the current period of movement of the movable component and the limit value of a preceding period of movement of the movable component always has a same sign for a number of successive periods;
collecting further state values of the drive in real time; and
taking the state values of the drive into account for determining the limit value of the measured variable.

8. The method according to claim 7, wherein from taking into account the state values of the drive, a time-depending correction value is derived, which has the same sign and which is added to the limit value for the current period.

9. The method according to claim 1, wherein in addition to the limit value during detecting a collision, operating states including at least one of an acceleration of the movable component, idling or production, is taken into account.

10. A container handling machine for handling containers, comprising:
a movable component, wherein the movable component is a periodically moving, electrically driven component;
at least one sensor that is to collect a measured variable that is indicative of movement of the movable component; and
a control unit for controlling the movement of the movable component, wherein the control unit is to:
dynamically determine a limit value for the measured variable that is indicative of a collision between the movable component and an additional component or a container for a current period of movement of the movable component on a basis of the measured variable as measured during a preceding period of movement of the movable component;
determine, for the movable component of the container handling machine, whether the limit value for the measured variable that is indicative of a collision between the movable component and the additional component or the container is exceeded; and
responsive to a determination that the limit value is exceeded, prompt a drive of the movable component to be shut down.

11. The container handling machine according to claim 10, further comprising:
at least one of sensors for detecting acceleration of the movable component, sensors for detecting temperature values, which are indicative of a function of the drive, and sensors for detecting load of the movable component.

12. The container handling machine according to claim 10, further comprising:
a non-volatile memory assigned to the control unit, in which calculated limit values may be stored and retrieved by the control unit for further use.

13. The container handling machine according to claim 12, wherein in the non-volatile memory further operating parameters, which can be used for calculating the calculated limit values, may be stored and retrieved by the control unit.

14. The container handling machine according to claim 10, wherein the limit value of the measured variable for the current period of movement of the movable component is to be dynamically determined on the basis of the measured variable measured during a directly preceding period of movement of the movable component.

15. The container handling machine according to claim 10, wherein the limit value of the measured variable for the current period differs from the limit value of the measured variable of the preceding period at the most by at least one of a maximum absolute value or a maximum relative value.

16. The container handling machine according to claim 15, wherein at least one of the maximum absolute value or the maximum relative value is to be determined by the control unit on the basis of at least one of an operating duration of the container handling machine, an age of the movable component, or an age of a motor driving the movable component.

17. The container handling machine according to claim 10, wherein the limit value is a non-constant function over an entire period duration or is constant over the entire period duration.

18. The container handling machine according to claim 10, wherein the measured variable is at least one of a torque transmitted to the movable component, a contouring error of the drive, a motor current or a load torque.

19. The container handling machine according to claim 10, wherein the control unit is further to:

determine that a difference from the limit value of the current period of movement of the movable component and the limit value of a preceding period of movement of the movable component always has the same sign for a number of successive periods;

collect further state values of the drive in real time; and take the state values of the drive into account for determining the limit value of the measured variable.

20. A method for collision monitoring, comprising:

dynamically determining a limit value for a measured variable that is indicative of a collision between a container transported in a container handling machine and a component of the container handling machine or an additional container transported in the container handling machine on a basis of the measured variable as measured while a preceding container had been transported by the container handling machine;

determining, for the container transported in the container handling machine, whether the limit value of the measured variable that is indicative of a collision of the container with the component or with the additional container is exceeded; and responsive to determining that the limit value is exceeded, shutting down operation of the container handling machine.

* * * * *